US009234146B2

(12) United States Patent
Koseoglu

(10) Patent No.: US 9,234,146 B2
(45) Date of Patent: Jan. 12, 2016

(54) PROCESS FOR THE GASIFICATION OF HEAVY RESIDUAL OIL WITH PARTICULATE COKE FROM A DELAYED COKING UNIT

(75) Inventor: Omer Refa Koseoglu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 707 days.

(21) Appl. No.: 13/495,237

(22) Filed: Jun. 13, 2012

(65) Prior Publication Data

US 2013/0028834 A1    Jan. 31, 2013

Related U.S. Application Data

(60) Provisional application No. 61/512,083, filed on Jul. 27, 2011.

(51) Int. Cl.
| | | |
|---|---|---|
| *C01B 3/12* | (2006.01) | |
| *C01B 3/38* | (2006.01) | |
| *C10J 3/46* | (2006.01) | |
| *C10K 3/04* | (2006.01) | |
| *C10B 55/00* | (2006.01) | |
| *C10B 57/06* | (2006.01) | |

(52) U.S. Cl.
CPC . *C10J 3/466* (2013.01); *C10K 3/04* (2013.01); *C10B 55/00* (2013.01); *C10B 57/06* (2013.01); *C10J 2300/0906* (2013.01); *C10J 2300/0943* (2013.01); *C10J 2300/0959* (2013.01); *C10J 2300/0976* (2013.01); *C10J 2300/0989* (2013.01); *C10J 2300/0993* (2013.01); *C10J 2300/1675* (2013.01); *C10J 2300/1846* (2013.01); *C10J 2300/1884* (2013.01); *C10J 2300/1892* (2013.01); *Y02E 20/16* (2013.01); *Y02E 20/18* (2013.01); *Y02P 30/30* (2015.11)

(58) Field of Classification Search
None
See application file for complete search history.

(56) References Cited

U.S. PATENT DOCUMENTS

| | | | |
|---|---|---|---|
| 2,751,334 | A | 6/1956 | Scott, Jr. |
| 3,684,689 | A | 8/1972 | Patton et al. |
| 3,713,794 | A | 1/1973 | Maher et al. |

(Continued)

FOREIGN PATENT DOCUMENTS

| | | | |
|---|---|---|---|
| EP | 0142889 A2 | 5/1985 | |
| EP | 0433547 A1 | 6/1991 | |

(Continued)

OTHER PUBLICATIONS

International Search Report and Written Opinion mailed Oct. 18, 2012 by the European Patent Office in related international application PCT/US2012/042150.

*Primary Examiner* — Melvin C Mayes
*Assistant Examiner* — Michael Forrest
(74) *Attorney, Agent, or Firm* — Abelman, Frayne & Schwab

(57) ABSTRACT

A process for the production of a synthesis gas containing hydrogen and carbon monoxide utilizes ground coke having a predetermined ash content in combination with a refinery residual hydrocarbon oil feedstream for gasification in the combustion chamber of a tubular wall membrane partial oxidation gasification reactor in the presence of a predetermined amount of oxygen; the coke and residual oil can be mixed to form a single feedstream or introduced into the reactor as separate feeds. Optionally, the product synthesis gas is introduced as the feedstream to a water-gas shift reactor to enhance the hydrogen content of the final product stream.

24 Claims, 4 Drawing Sheets

(56) References Cited

U.S. PATENT DOCUMENTS

| | | |
|---|---|---|
| 3,779,900 A | 12/1973 | Molstedt |
| 3,803,023 A | 4/1974 | Hamner |
| 4,014,786 A | 3/1977 | Potter et al. |
| 4,021,366 A * | 5/1977 | Robin et al. .................. 252/373 |
| 4,066,532 A | 1/1978 | Garcia |
| 4,074,981 A | 2/1978 | Slater |
| 4,099,382 A | 7/1978 | Paull et al. |
| 4,099,383 A | 7/1978 | Paull et al. |
| 4,121,912 A | 10/1978 | Barber et al. |
| 4,202,672 A | 5/1980 | Schuurman |
| 4,213,848 A | 7/1980 | Saxton |
| 4,269,696 A | 5/1981 | Metrailer |
| 4,302,324 A | 11/1981 | Chen et al. |
| 4,394,250 A | 7/1983 | Grossberg |
| 4,492,625 A | 1/1985 | Allan |
| 4,551,223 A | 11/1985 | Sadhukhan |
| 4,668,130 A | 5/1987 | Sharp |
| 4,803,061 A * | 2/1989 | Najjar et al. ............... 423/418.2 |
| 4,818,252 A | 4/1989 | Kohnen et al. |
| 4,959,080 A | 9/1990 | Sternling |
| 4,983,272 A | 1/1991 | Stavropoulos |
| 5,087,271 A | 2/1992 | Stellaccio et al. |
| 5,251,433 A | 10/1993 | Wallace |
| 5,345,756 A | 9/1994 | Jahnke et al. |
| 5,356,530 A | 10/1994 | Calderon |
| 5,435,940 A | 7/1995 | Doering et al. |
| 5,645,711 A | 7/1997 | Hraban et al. |
| 5,904,477 A | 5/1999 | Van Dam et al. |
| 6,533,925 B1 | 3/2003 | Wallace et al. |
| 8,048,178 B2 | 11/2011 | Smit et al. |
| 2007/0051043 A1 | 3/2007 | Schingnitz et al. |
| 2007/0062117 A1 | 3/2007 | Schingnitz et al. |
| 2007/0079554 A1 | 4/2007 | Schingnitz et al. |
| 2007/0225382 A1 | 9/2007 | Van Den Berg et al. |
| 2007/0245736 A1 * | 10/2007 | Barnicki ........................ 60/670 |
| 2008/0000404 A1 | 1/2008 | Fischer et al. |
| 2008/0047196 A1 | 2/2008 | Schingnitz |
| 2008/0256860 A1 | 10/2008 | Von Kossak-Glowczewski |
| 2008/0262111 A1 | 10/2008 | Ploeg et al. |
| 2009/0029299 A1 | 1/2009 | Fischer et al. |
| 2009/0049747 A1 | 2/2009 | Von Kossak-Glowczewski et al. |
| 2009/0294328 A1 | 12/2009 | Iqbal |
| 2010/0074839 A1 * | 3/2010 | Drnevich et al. ............. 423/655 |
| 2014/0103261 A1 | 4/2014 | De Jong et al. |

FOREIGN PATENT DOCUMENTS

| | | |
|---|---|---|
| JP | 4-215835 A | 8/1992 |
| JP | 4-353225 A | 12/1992 |
| JP | 2006-89628 A | 4/2006 |
| WO | 95/13339 A1 | 5/1995 |
| WO | WO 9513339 A1 * | 5/1995 ................ C10J 3/46 |
| WO | 2006/032644 A1 | 3/2006 |
| WO | 2009/020809 A1 | 2/2009 |

* cited by examiner

PROCESS FOR THE GASIFICATION OF HEAVY RESIDUAL OIL WITH PARTICULATE COKE FROM A DELAYED COKING UNIT

RELATED APPLICATION

This application claims the benefit of U.S. Provisional Patent Application No. 61/512,083 filed Jul. 27, 2011, the disclosure of which is hereby incorporated by reference.

FIELD OF THE INVENTION

This invention relates to processes for the recovery of hydrocarbons by the partial oxidation in a membrane wall reactor of a heavy residual oil from a refinery process with an ash-producing material.

BACKGROUND OF THE INVENTION

Gasification is well known in the art and it is practiced worldwide with application to solid and heavy liquid fossil fuels, including refinery bottoms. The gasification process converts carbonaceous materials, such as coal, petroleum, biofuel, or biomass with oxygen at high temperature, i.e., greater than 800° C., into synthesis gas, or syngas, steam and electricity. The syngas can be burned directly in internal combustion engines, or it can be separated or used to produce methanol via synthesis, or converted into synthetic fuels via the Fischer-Tropsch process. There are two reactor types used in gasification: refractory and membrane wall reactors. The latter process requires solid particles in the feedstock and therefore is applied to solid fuels or liquid fuels containing solids.

Gasification uses partial oxidation to convert any carbon contained in a feedstock into synthesis gas consisting of carbon monoxide (CO) and hydrogen, which in turn can be used in the manufacture of various chemicals ranging from fertilizers to liquid fuels or petrochemicals. According to the desired end product, the gasification process unit or block incorporates several technologies.

For refining applications, the main process block is known as the Integrated Gasification Combined Cycle (IGCC), which converts the feedstock into hydrogen, power and steam. FIG. 1 shows the process flow diagram of a conventional IGCC of the prior art. The IGCC is a complex integrated process, consisting of sections, including feed line 101 and feed preparation 102, air separation unit 180 with oxygen feed 103, gasification reactor 104 producing syngas 106, syngas quench and cooling unit 110, with generated steam 112 and cooled syngas 114 passing to water-gas shift reactor 120, acid gas removal (AGR) and sulfur recovery unit (SRU) 130 for treatment of shift gas 122 and separation of carbon dioxide 136 and sulfur 138, high hydrogen syngas recovery 132 and/or gas (WGS) turbine feed 134, and a combined cycle package including gas turbine 140 with air feed 142 for producing electricity 144 and a high pressure discharge 146, a heat recovery steam generator (HRSG) 150 receiving steam 116 and boiler feed water 152 and producing steam 154 and boiler feed water 156 for delivery to cooling unit 110, and steam turbine 160 for producing electricity 162.

The air separation unit 180 and most of the downstream processes utilize mature technologies with high on-stream reliability factors. However, the gasifier 104 has a relatively limited lifetime that can be as short as from 3 to 18 months, depending upon the characteristics of the feed and the design of the unit.

Three principal types of gasifier technologies are moving bed, fluidized bed and entrained-flow systems. Each of the three types can be used with solid fuels, but only the entrained-flow reactor has been demonstrated to process liquid fuels. In an entrained flow reactor, the fuel and oxygen and steam are injected at the top of the gasifier through a co-annular burner. The gasification usually takes place in a refractory-lined vessel which operates at a pressure of about 40 to 60 bars and a temperature in the range of from 1300° C. to 1600° C.

For production of liquid fuels and petrochemicals, the key parameter is the $H_2/CO$ ratio of the dry syngas. This ratio in the syngas produced is usually between 0.85 and 1.2 depending upon the feedstock characteristics. Thus, additional treatment of the syngas is needed to increase this ratio up to 2 for Fischer-Tropsch applications or to convert CO to hydrogen through the water-gas shift reaction represented by $CO+H_2O=CO_2+H_2$. In some cases, part of the syngas is burned together with some off gases in a combined cycle to produce power and steam. The overall efficiency of this process is between 44% and 48%.

The major benefits for a refinery using a heavy residue gasification process are that it provides a source of hydrogen for hydroprocessing to meet the demand for light products; it produces power and steam for refinery use or for export and sale; it can take advantage of efficient power generation technology as compared to conventional technologies that combust heavy residue; and it produces lower pollutant emissions as compared to conventional technologies that combust heavy residues for disposal. Furthermore, the process provides a local solution for heavy residue where produced, thus avoiding off-site transportation or storage; it also provides the potential for disposal of other refinery waste streams, including hazardous materials; and a potential carbon management tool, i.e., a $CO_2$ capture option is provided if required by the local regulatory system.

Gasification technology has a long history of research and development, and many units are in operation worldwide. For refining applications, it is of potential utility where hydrogen is needed for hydroprocessing and natural gas is not available, and the prices of the feed used for gasification are very low. This is usually the case in refineries where full conversion is required to meet the demand of cleaner light products, such as gasoline, jet fuel and diesel transportation fuels.

The gasifier conventionally uses refractory liners to protect the reactor vessel from elevated temperatures that range from 1400° C. to 1700° C., corrosive slag and thermal cycling. The refractory is subjected to the penetration of corrosive components from the syngas and slag and thus subsequent reactions in which the reactants undergo significant volume changes that result in strength degradation of the refractory materials. The replacement of refractory linings can cost several millions of dollars a year and several weeks of downtime for a given reactor. Up until now, the solution has been the installation of a second or parallel gasifier to provide the necessary capacity, but the undesirable consequence of this duplication is a significant increase in the capital costs associated with the unit operation.

Research has been reported that is directed to means that will increase the useful life of the gasifier refractory material and thus increase the economic competitiveness of the gasification process. This includes new refractory materials and new technologies such as membrane reactors which are expected to have high reliability and high availability compared to that of conventional lined refractory reactors.

Membrane wall gasifier technology uses a cooling screen protected by a layer of refractory material to provide a surface on which the molten slag solidifies and flows downward to the quench zone at the bottom of the reactor. The advantages of the membrane wall reactor include reduced reactor dimensions as compared to other systems and elimination of the need to have a parallel reactor to maintain continuous operation as in the case of refractory wall reactors; the on-stream time for a typical refractory wall reactor is 50%, therefore a parallel unit is required; however, the on-stream time for membrane wall reactors is 90% and there is no need for a second, parallel reactor; and the build-up of a layer of solid and liquid slag provides self-protection to the water-cooled wall sections.

The build-up of a layer of solidified mineral ash slag on the wall acts as an additional protective surface and insulator to minimize or reduce refractory degradation and heat losses through the wall. Thus the water-cooled reactor design avoids what is termed "hot wall" gasifier operation, which requires the construction of thick multiple-layers of expensive refractories which will remain subject to degradation. In the membrane wall reactor, the slag layer is renewed continuously with the deposit of solids on the relatively cool surface. Further advantages include short start-up/shut down times; lower maintenance costs than for the refractory type reactor; and the capability of gasifying feedstocks with high ash content, thereby providing greater flexibility in treating a wider range of coals, petcoke, coal/petcoke blends, biomass co-feed, and liquid feedstocks.

There are two principal types of membrane reactor designs that are adopted for processing of solid feedstocks. One such reactor uses vertical tubes in an up-flow process equipped with several burners for solid fuels, e.g., petcoke. A second solid feedstock reactor uses spiral tubes and down-flow processing for all fuels. For solid fuels, a single burner having a thermal output of about 500 MWt has been developed for commercial use.

In both of these reactors, the flow of pressurized cooling water in the tubes is controlled to cool the refractory and ensure the downward flow of the molten slag. Both systems have demonstrated high utility with solid fuels, but not with liquid fuels.

Delayed coking is a thermal cracking process used in petroleum refineries to upgrade and convert petroleum residuum, which are typically the bottoms from the atmospheric and vacuum distillation of crude oil, into liquid and gas product streams leaving behind petroleum coke as a solid concentrated carbon material. A fired furnace or heater with horizontal tubes is used in the process to reach thermal cracking temperatures of 485° C. to 505° C./905° F. to 941° F. With a short residence time in the furnace tubes, coking of the feed material is thereby "delayed" until it is discharged into large coking drums downstream of the heater.

In the practice of the delayed coking process, a hydrocarbon oil is heated to a coking temperature in a furnace or other heating device and the preheated oil is introduced into a coking drum to produce a vapor phase product, which also forms liquid hydrocarbons, and coke. Coke can be removed from the drum by hydraulic means or by mechanical means.

In most configurations of the delayed coking process, the fresh hydrocarbonaceous feed to the coking unit is first introduced into a coking unit product fractionating column, or fractionator, usually for heat exchange purposes, where it combines with the heavy coking unit oil products that are recycled as bottoms to the coking unit heater. It is known that decreasing the recycle ratio of the fractionator bottoms that are recycled to the delayed coker furnace results in an increase in the hydrocarbon liquid yield and a decrease in the coke yield of the delayed coker. Thus, the effect of the recycle ratio to coke yield is such that as recycle decreases, the cut point of the recycle increases.

A delayed coking process is disclosed in U.S. Pat. No. 4,492,625 in which the hydrocarbon feedstock having a boiling point of 925° F./450° C. is split before the furnace heating step with one portion being sent to the delayed coking unit furnace and a second portion being introduced directly into the coking unit product fractionator. At least a portion of the bottom residue, or bottoms, from this fractionator is recycled to the furnace where it is combined with the fresh hydrocarbon feedstock, and the combined feedstock is heated to a predetermined coking temperature and passed to the delayed coking unit.

The boiling point of the feedstream employed in the process described in the '625 patent indicates that the hydrocarbon feedstream had been previously upgraded, e.g., by vacuum distillation before processing in the delayed coking unit and being introduced into the fractionator above the coking unit product feed to the fractionator. There is no significant effect on the capital or operating costs associated with the operation of the product fractionator in this mode. Rather, it is equivalent to the conventional steps of atmospheric distillation followed by vacuum distillation of whole crude oil, followed by coking of the residuum or bottoms.

A process is described in U.S. Pat. No. 4,066,532 for delayed coking in which the fresh feedstock is introduced to a preheating furnace as a mixture with the bottoms and a portion of the heavy gas oil side stream from the coking unit product fractionator, or fractionating column. It is stated that the recycling of the heavy gas oil will result in an increase in the aromaticity of this side stream, a portion of which can advantageously be used for carbon black production. The fresh feedstock is described as including coal tar and decanted cracking oil having prescribed sulfur, ash and asphaltene contents. The temperature of the mixed feedstock is raised to 450° C. to 510° C./842° F. to 950° F. in the preheating furnace.

A catalytically enhanced delayed coking process is described in U.S. Pat. No. 4,394,250 in which from about 0.1% to 3% of catalyst and hydrogen are added to the feedstock before it is introduced into the furnace with a portion of the fractionator bottoms. The feedstock is selected from heavy low-grade oil such as heavy virgin crude, reduced crude, topped crude, and residuums from refining processes.

It is an object of this invention to provide a process that is capable of producing syngas products that can be used as a feedstream for other processes in the same refinery by the gasification of heavy refinery residual oils in which a sufficient amount of solid ash-forming material is provided from a source in the same refinery that is reliable, energy-efficient and environmentally acceptable.

SUMMARY OF THE INVENTION

The present invention comprehends a process for gasification in a membrane wall reactor of residual oil bottoms from various refinery operations that have been mixed with finely ground flowable petroleum coke particles derived from a delayed coking operation of feedstocks containing high ash content or solid additives. The mixture of liquid oil and solid coke particles can be introduced into the membrane wall reactor together as a combined feedstock for gasification, or as separate feedstock components for gasification. The ground coke particles can also be introduced in the form of a free-flowing fluidized feedstream into the combustion chamber of a tubular wall membrane partial oxidation gasification reactor in the presence of a predetermined amount of oxygen, or oxygen-containing gas, e.g., air, a fuel gas carrier, e.g., methane, an inert gas, e.g., nitrogen, argon, or carbon dioxide, or a combination thereof.

1. The Delayed Coking Process

After removal of the solid coke from the coking unit drum, it is processed to reduce it to a particulate form that is within a desired particle size range. The ground coke can include very fine particles, i.e., "dust", when it is introduced into the reactor either alone or with the residual oil, with a carrier gas, or gases, or other liquid(s). In certain embodiments, the ground coke passes a 35 mesh Tyler screen. In other embodiments, the ground coke passes a 70 mesh Tyler screen.

The coke should have an ash content of at least 2% by weight. The requirement for a relatively high ash content allows a lower grade of coke to be used in the process of the invention.

The determination of the size of the particles is based, at least in part, on the design and mode of operation of the membrane reactor. For example, coldwall membrane reactors suitable for use in the present invention are adapted to receive pressurized feedstocks that contain solid materials through a nozzle or jet device. The gases produced by the partial oxidation of the feedstock, fuel and limited oxygen introduced into the reactor combustion chamber contact the water-cooled tubular side walls and the vaporized slag is condensed and forms a layer which partially solidifies on a relatively thin refractory coating applied to the tubes; the remaining molten slag flows downwardly under the force of gravity to the lower end of the walls where it collects and is eventually removed from the reactor.

2. Mixed Feedstream of Ground Coke Particles and Oil

In another preferred embodiment of the invention, the ground coke particles are introduced into the membrane reactor with residual oil from a local or associated refinery process. It is desirable to mix the coke particles with the oil so that they are introduced as a feedstock of uniform consistency and content. The feedstock blend should have a solid composition of at least 2 W %. This mode of operation assures a more uniform combustion or partial oxidation of the components and the development of the ash that leads to the formation of solid and liquid slag upon contact with the water-cooled reactor walls. The liquid slag formed from the ash contacting the relatively cooler wall runs down the solid slag layer as a film of liquid slag and leaves the gasification space together with the gasification gases. The slag provides thermal insulation between the reactor wall and the cooling channels.

In order to obtain an intimate and uniform mixture of the ground coke particles and the residual oil, the two components are introduced into a mixing vessel. The vessel can be equipped with a circulation device, such as an impeller. The circulation device can also include a pump to move the liquid from the bottom of the vessel to the top. Suitable mixing and circulation devices are well known in the art.

The uniform mixture of particles in oil can be maintained in a stirred vessel and withdrawn as needed by pumping the fluid mixture to the required pressure for introduction into the pressurized membrane reactor. In order to maintain the proper stoichiometric ratio of feedstock, fuel and oxygen, the ground coke and oil composition is periodically analyzed and the respective flow rates controlled by appropriate and well known automated systems of meters, pumps and pressure regulating devices, all of which are within the skill of the art.

The amount of ash required to optimize the performance and useful life of a given reactor can be determined experimentally using ASTM Method D-482, or by an experienced operator during the operation of the reactor.

In another embodiment of the invention, the ground coke particles are mixed with water to form a uniform pumpable slurry that is introduced under pressure into the membrane wall reactor. This embodiment is used when a combustion modifier is required to properly balance the reactants to obtain the desired quality of the syngas.

The solid particulate coke can also be fluidized in a stream of air or another oxygen-containing process gas in order to support the combustion required for partial oxidation. In certain embodiments, inert gases such as nitrogen, argon or carbon dioxide, are used to fluidize the solid particulate coke. In further embodiments, carbon dioxide for fluidization is recycled from the water-gas shift reaction zone. The solid particulate material can be maintained in a feed reservoir, e.g., a pressurized hopper and metered, as by a screw conveyer into a conduit through which the pressurized gas stream is passing on its way to the membrane reactor. In an alternative embodiment, the ground coke particles can be fluidized with an available fuel gas obtained from another refinery unit operation.

Other apparatus and systems for producing either a wet or dry fluidized stream of the coke particles that are well known in the material handling arts can be used. For example, the coke solids can be fed to a high-temperature processing vessel without interruptions caused by bridging and plugging by the solids by passing the solids at a controlled rate from a feed vessel to a first conduit communicating with the feed vessel. The solids are then passed through the first conduit into a second conduit which communicates with the first conduit and the processing vessel, and which contains a scraper for scraping the inside walls of the conduit. The pressure in the feed vessel is maintained at a level higher than the pressure in the processing vessel by passing a sufficient amount of a gas into the feed vessel such that the solids are passed through the second conduit into the processing vessel in a dense phase pneumatic flow as the scraper contacts the inside walls of the second conduit to prevent any bridging or plugging. The scraper can include a wire helix which is rotated inside the second conduit. See for example, U.S. Pat. No. 4,668,130, the disclosure of which is incorporated herein by reference.

3. Sulfur Removal

Coke from delayed coking processes may contain sulfur in the form of reaction products and sulfur-poisoned catalyst materials that are retained in the coke. Coke containing sulfur and other forms of impurities that can render the product less desirable, if not unsuitable for use in certain processes, is an appropriate candidate for use in the process of the invention, particularly if its ash content is sufficient to meet the requirements of the gasification reactor.

During the partial oxidation of the coke particles in the membrane reactor, gaseous sulfur compounds are formed. These can include hydrogen sulfide, carbonyl sulfide and others. Nitrogen-containing hydrocarbons will also react to form ammonia. The sulfur-containing compounds are undesirable impurities and are preferably removed from the syngas using known conventional processes and apparatus.

4. Enhancing the Syngas Hydrogen Content

In a further embodiment of the present invention, the syngas product stream is introduced as the feedstream for a water-gas shift (WGS) reaction in order to increase the volume of hydrogen recovered. In the water-gas shift reaction, carbon monoxide reacts with steam at high temperature, and optionally in the presence of one or more catalysts, to yield carbon dioxide and hydrogen in an exothermic reaction. The carbon monoxide and hydrogen can be separated to provide a relatively high purity product stream containing 95 to 99.5 V % of hydrogen.

The inclusion of the water-gas shift reactor for processing the syngas obtained from the partial oxidation gasification of the ground coke particles in the tubular wall membrane reactor provides the advantage of an energy efficient and economical process for obtaining high quality hydrogen that is derived from the processing of relatively low grade liquid hydrocarbon residual oil feedstreams with low value coke having a high ash content in a delayed coking unit.

BRIEF DESCRIPTION OF THE DRAWINGS

The invention will be described in further detail below and with reference to the attached drawings in which the same and similar elements are referred to by the same number, and where.

DETAILED DESCRIPTION OF THE PREFERRED EMBODIMENT

Figure 1:
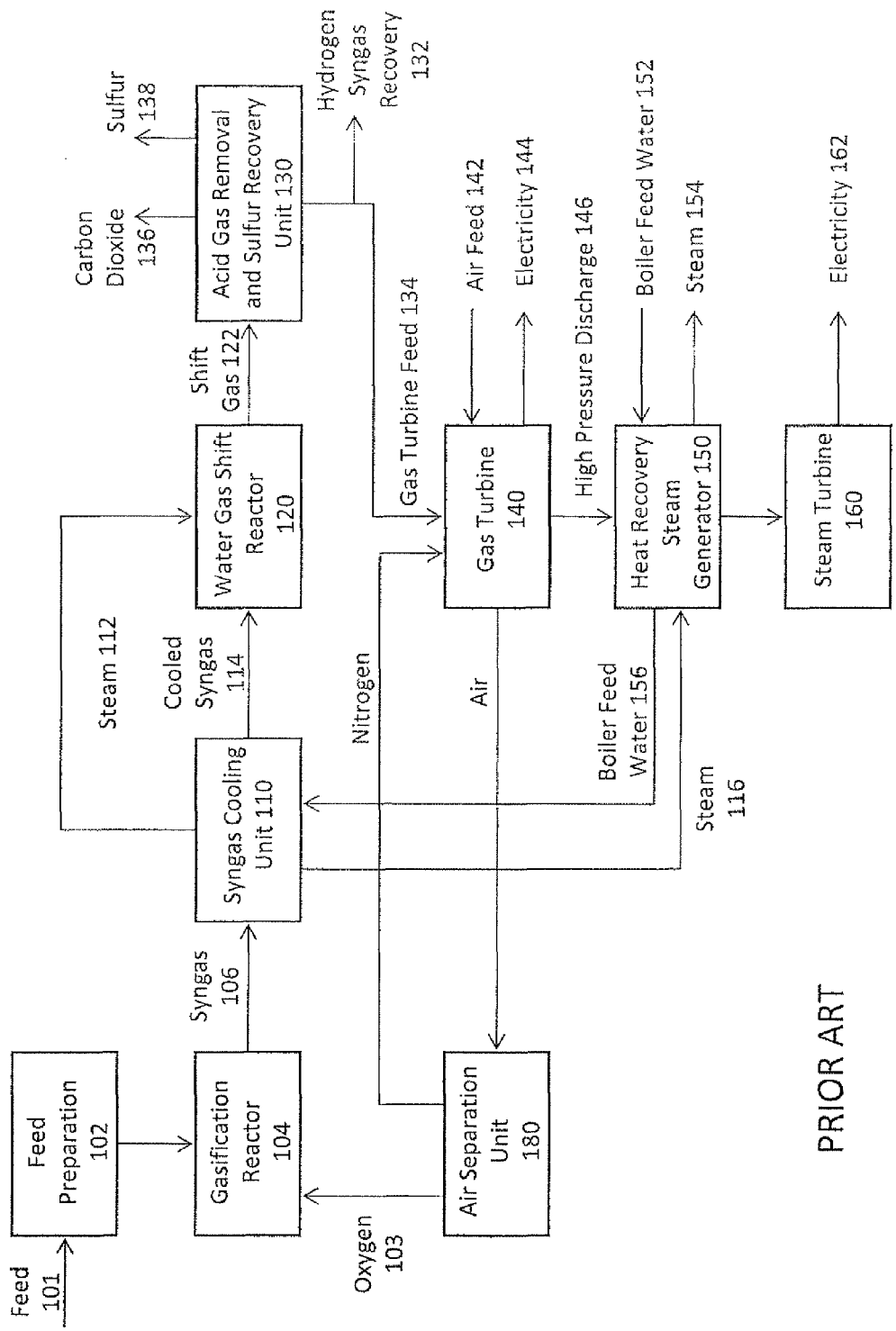
FIG. 1 is a schematic diagram of an integrated gasification-combined cycle process of the prior art.
Figure 2:
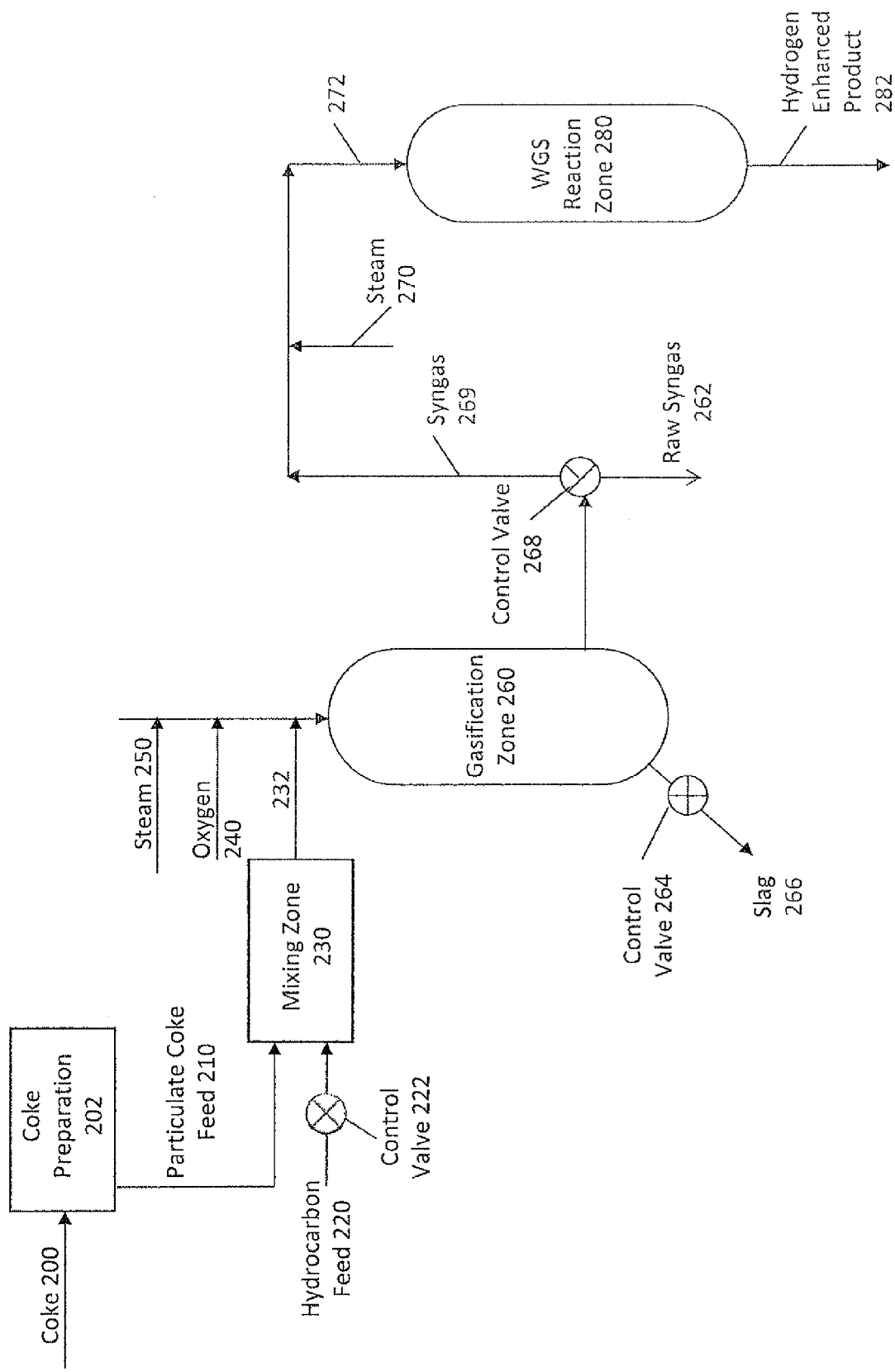
FIG. 2 is a schematic diagram of the integrated process of the present invention for the gasification of particulate coke and a liquid hydrocarbon.

The process of the invention will be further described with reference to the schematic diagram of FIG. 2 where the raw coke 200 is processed in coke preparation apparatus 202 to provide a particulate coke feed 210 that is introduced into mixing zone 230. A liquid residual oil hydrocarbon feed 220 passes from a source through regulating control valve 222 and is introduced into mixing zone 230. The uniform mixture of ground coke particles and liquid hydrocarbon 232 is discharged from the mixing zone and is introduced into the gasification zone 260 with controlled amounts of oxygen 240 and steam 250. The partial oxidation reaction proceeds in gasification zone 260 in which the produced ash component contacts the water-cooled sides of the membrane wall reactor to form solid and liquid slag at the surface which is eventually recovered at the base of the gasification zone 260 and is withdrawn at 266 via control valve means 264. The raw syngas 262 produced in the gasification zone can be withdrawn via three-way control valve 268 for use in other downstream processes.

In a preferred embodiment of the present invention, some or all of the syngas 269 passes via three-way control valve 268 to a water-gas shift ("WGS") reaction zone 280. Upstream of the WGS reaction zone, steam 270 is mixed with the syngas and the mixture 272 is introduced into WGS reaction zone 280. The carbon monoxide component of the syngas reacts with the water molecules in the steam to produce hydrogen and carbon dioxide in the WGS reactor. The shifted syngas product, now having a significantly higher concentration of hydrogen is recovered as product 282. Thus, in accordance with the process of the invention, valuable end products, e.g. syngas and/or hydrogen can be obtained from a low grade coke and residual oils.

The WGS reactor can be operated in a temperature range of 150° C. to 400° C., but preferably at 200° C. to 350° C., and most preferably at 300° C. to 350° C. The pressure can range from 1 to 60 bars. The water-to-carbon monoxide mole ratio is in the range of from 5-to-1 and preferably in the range of from 3-to-1.

The process of the invention can be further enhanced by an amine absorption column that removes sour gases from the syngas. This process and equipment are commonly used in hydroprocessing. It is noted that carbonyl sulfide (COS) is not easily removed by conventional amine treatment methods. Therefore, to minimize such contaminants in the syngas, the COS can be converted into $H_2S$ by hydrolysis upstream of the amine unit. Ammonia, nitrogen and a small amount of hydrogen cyanide can also be formed in the gasification zone. Ammonia and hydrogen cyanide can be removed, e.g., by a water scrubbing step.

Figure 3:
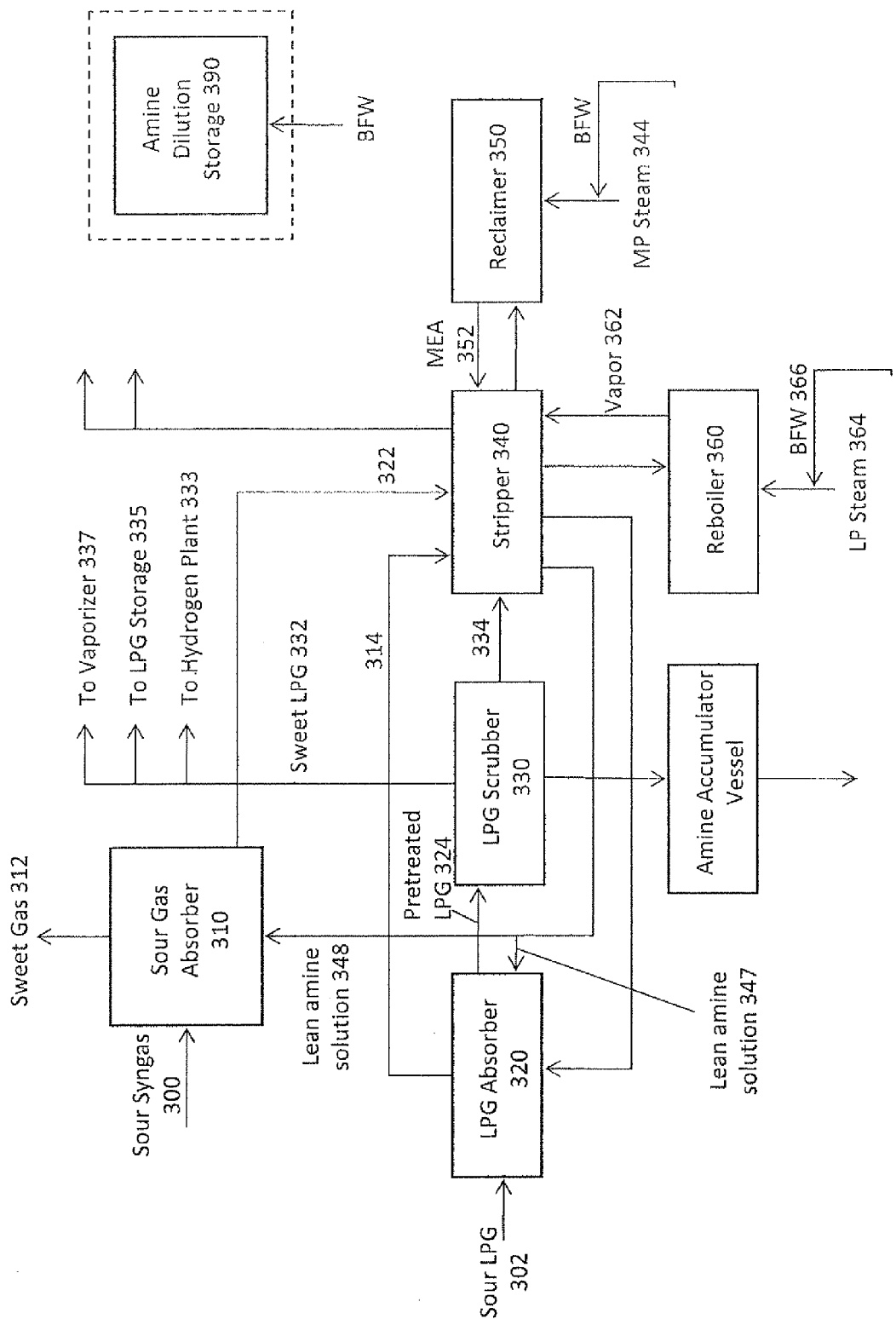
FIG. 3 is a schematic diagram of an amine treatment unit suitable for use in the practice of the process of the present invention.

Referring now to FIG. 3, there is schematically illustrated an amine treating unit suitable for use in the present invention for the removal of sulfur and other contaminants from the syngas product. The process is also referred to as amine sweetening and the product as sweet gas. The contaminants removed include hydrogen sulfide ($H_2S$), carbonyl sulfide (COS) and mercaptans (RSH), where R is the hydrocarbon component. These contaminants are typically present in sour gas streams produced in the gas oil hydrodesulfurization (HDS) unit. Gas and liquified petroleum gas (LPG) from the crude distillation plant can also contain these contaminants. The amount of sour contaminants depends on the type of crude oil being processed. Hydrogen sulfide is corrosive, highly toxic, and flammable. Amine solutions have a strong affinity for hydrogen sulfide gas at temperatures of 30 to 45° C. Amines do not absorb hydrocarbon gases. The amine used in the unit depicted in FIG. 3 can be monoethanolamine (MEA), preferably in the form of an 18% to 20% solution in water. The unit is divided into six major sections that are described below.

Sour Gas Absorber Section

In the sour gas absorber section 310, the sour syngas 300 is treated by countercurrent contact with lean amine solution 348 which absorbs most of the hydrogen sulfide from the sour gas stream. Sweet syngas 312 is produced and routed for downstream processes, and the saturated amine 322 is discharged for treatment.

LPG Absorber Section

In the LPG absorber section 320, sour LPG 302 is treated by countercurrent contact with lean amine solution 347 which absorbs most of the hydrogen sulfide from the LPG stream, and is discharged as saturated amine stream 314.

LPG Scrubber Section

In the LPG scrubber 330, the remaining hydrogen sulfide and mercaptans in the pretreated LPG stream 324 are removed by caustic soda. The hydrogen sulfide and mercaptans are retained by the spent caustic soda 334. The sweet LPG 332 can be routed to the hydrogen plant 333, the LPG sphere 335, and/or the vaporizer 337 in the crude distillation unit.

Stripper Section

In the stripper section 340, the regeneration of rich or saturated amine 314, 322, 334 into the lean amine 347, 348 solutions takes place in a stripper column using vapor 362 generated in a reboiler 360 to which is fed steam 364 and boil feed water 366.

Reclaimer Section

The reclaimer 350 recovers MEA 352 as a vapor from the feed 344. The polymerization products which accumulate during regeneration degrade the amine solution. These products are deposited at the bottom of the reclaimer 350 and vaporized MEA 352 is returned to the stripper column 340.

Amine Dilution/Storage Section

In the fresh amine mixing/storage section 390, facilities are provided to mix, store and recover amine solution and to replenish the sour gas absorber 310.

The invention will be further described in connection with the schematic process diagram of FIG. 4 and the following example that was developed using a simulation model based on stoichometric reaction rates that best fit the gasifier data. The simulator utilizes data from the elemental analysis of the feedstock, e.g., carbon, hydrogen, sulfur, nitrogen and ash, to predict the gasifier yields. A small portion of the sulfur present is converted to carbonyl sulfide; nitrogen present is converted to nitrogen gas, $N_2$, (about 90%) and ammonia, $NH_3$ (about 10%); and a trace amount of hydrogen cyanide is also formed.

EXAMPLE

Figure 4:
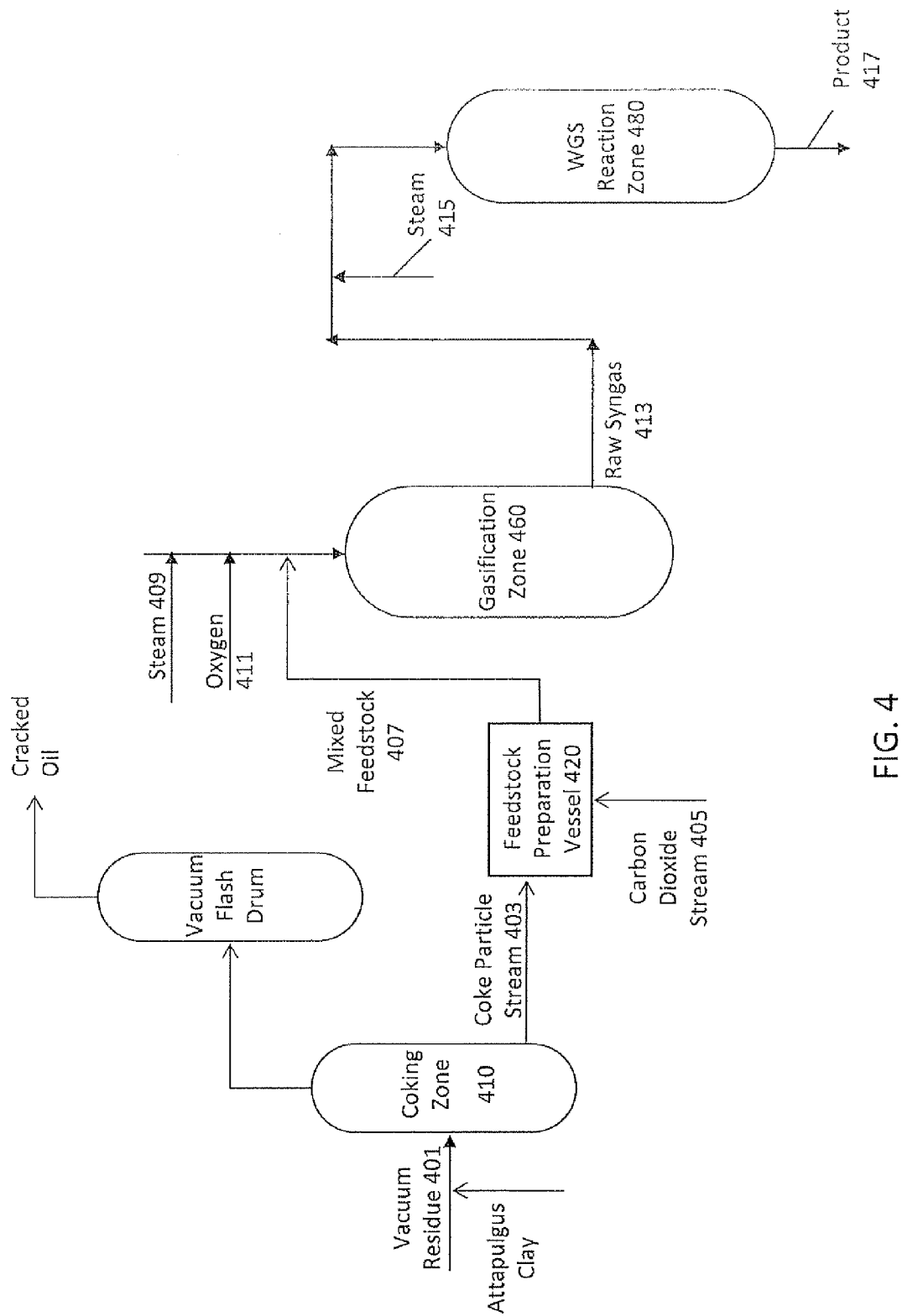
FIG. 4 is a schematic diagram of another embodiment of the invention for the gasification using ground coke as a separate fluidized feed stream to the reactor.

The process configuration of an integrated delayed coking and gasification process and system is shown in FIG. 4. A vacuum residue stream 401 obtained from Arabian heavy crude oil is mixed with 2 W % of attapulgus clay and processed in an integrated delayed coking and gasification unit. The elemental composition of vacuum residue is shown in Table 1.

TABLE 1

Properties of Feedstock

| Property | Value |
|---|---|
| API Gravity, ° | 4.6 |
| SG | 1.04 |
| Carbon Content, W % | 83.89 |
| Hydrogen, W % | 10.25 |
| Sulfur, W % | 5.33 |
| Nitrogen, W % | 0.43 |
| Oxygen, W % | 0.10 |
| CCR, W % | 24.6 |
| C5-Asphalthenes, W % | 23.5 |
| Nickel, ppmw | 44 |
| Vanadium, ppmw | 162 |

The delayed coking unit, or coker, 410 was operated at 496° C. and atmospheric pressure. The delayed coker product yields are shown in Table 2.

TABLE 2

Delayed Coker Product Yields

| | Yields, W % |
|---|---|
| Coke | 43.4 |
| Gas | 11.5 |
| $H_2S$ | 2.0 |
| $C_1$-$C_4$ | 9.5 |
| $H_2S$ | 0.1 |
| $CO_2$ | 0.0 |
| Naphtha (36-180) | 19.0 |
| LCGO (180-350) | 14.0 |
| HCGO (350-540) | 12.1 |
| Total | 100.0 |

The coke particle stream 403 was fluidized with carbon dioxide stream 405 in a feedstock preparation vessel 420. The mixed feedstock stream 407, steam 409 and oxygen 411 were introduced into the gasification zone 460 which was operated at 1045° C. The ratio of water-to-carbon was 0.6:1 by weight. The ratio of oxygen-to-vacuum residue was 1:1 by weight.

Feedstock mixture 407 was partially oxidized to produce raw syngas 413, consisting of hydrogen and carbon monoxide, and a slag material as described above in connection with FIG. 2. The raw syngas 413 and steam 415 were sent to a water-gas shift reaction zone 480 to increase the hydrogen yield in the product stream 417. The water-gas shift reaction zone 480 was operated at 318° C. and 1 bar. The mole ratio of steam-to-carbon monoxide was 3:1. The product yields are summarized in Table 3.

TABLE 3

Product Yields

| | Stream # | | | | | |
|---|---|---|---|---|---|---|
| | 407 | 409 | 411 | 413 | 415 | 417 |
| | Reactor | | | | | |
| | Gasifier In Kg | Gasifier In Kg | Gasifier In Kg | Gasifier Out Kg | WGS In Kg | WGS Out Kg |
| Vacuum Residue | 1000.0 | | | | | |
| Vacuum Residue (HC) | 942.6 | | | | | |
| Oxygen | | | 1000.0 | | | |
| $CH_4$ | | | | 6.3 | | 6.3 |
| $H_2$ | | | | 116.8 | | 232.6 |
| CO | | | | 1680.0 | | 69.4 |
| $CO_2$ | | | | 359.5 | | 2890.3 |
| $H_2O$ | | 493.5 | | 159.4 | 1470.5 | 594.6 |
| $H_2S$ | | | | 50.0 | | 50.0 |
| COS | | | | 9.8 | | 9.8 |
| $N_2$ | | | | 7.6 | | 7.6 |
| $NH_3$ | | | | 0.4 | | 0.4 |
| Total | 1000.0 | 493.5 | 1000.0 | 2389.7 | 1470.5 | 3861.0 |

The invention has been described with reference to its preferred embodiments and an example and various modifications will be apparent to those of ordinary skill in the art from this description. The scope of protection which is to be accorded the invention is to be determined by the claims that follow.

I claim:

1. An integrated process for the gasification of a heavy residual hydrocarbon oil feedstream with coke derived from a delayed coking process to produce synthesis gas and electricity, the gasification process comprising:
   a. analyzing the coke from the delayed coking process to determine its ash content:
   b. grinding the coke from the delayed coking process to produce a free-flowing mass of hydrocarbon-containing coke particles having a predetermined ash content;
   c. introducing the ground coke particles into a moving fluid feedstream to form a pressurized fluidized feed;
   d. providing a feedstream of the heavy residual hydrocarbon oil;
   e. injecting the fluidized coke particles and the heavy residual hydrocarbon oil feedstream having a combined ash content of at least 2% by weight into the combustion chamber of a cold-wall tubular wall membrane partial oxidation gasification reactor in the presence of a predetermined amount of oxygen;
   f. operating the gasification reactor at a temperature in the range of 900° C. to 1700° C. and a pressure of from 20 to 100 bars;
   g. subjecting the feedstock to partial oxidation to produce hydrogen, carbon monoxide and a slag material;

h. recovering the hydrogen and carbon monoxide from the reactor in the form of a synthesis gas;
i. passing the hot synthesis gas to a water-cooled heat exchanger to cool the synthesis gas; and
j. recovering high pressure steam from the heat exchanger and introducing the steam into a turbine to produce electricity.

2. The process of claim 1 in which the ash content of the coke particles is from 2 W % to 10 W %.

3. The process of claim 1 in which the coke particles are fluidized in a gaseous feedstream to form the feed to the membrane reactor.

4. The process of claim 3 in which the gaseous feedstream contains oxygen.

5. The process of claim 4 in which the gaseous feedstream is air.

6. The process of claim 4 which includes controlling the amount of coke particles and oxygen entering the reactor to provide a stochiometric balance for partial combustion based on the hydrocarbon content of the coke particles and the residual hydrocarbon oil.

7. The process of claim 1 in which the ratio of oxygen-to-carbon in the gasifier is from 0.5:1 to 10:1 by weight.

8. The process of claim 7 in which the ratio of oxygen-to-carbon is from about 1:1 to 2:1 by weight.

9. The process of claim 1 in which the coke particles are fluidized in at least a portion of the residual oil feedstream to form the feedstock for the membrane reactor.

10. The process of claim 1 in which the ground coke particles pass a 35 Tyler mesh size screen.

11. The method of claim 10 in which the coke particles are mixed with the residual oil to form a uniform pumpable dispersion.

12. The process of claim 1 which includes introducing steam into the reactor combustion chamber in the ratio of from 0.1:1 to 10:1 by weight of carbon in the feedstock.

13. The process of claim 12 in which the steam is introduced in the ratio of from 0.1:1 to 2:1 by weight of carbon in the feedstock.

14. The process of claim 12 in which the steam is introduced in the ratio of from 0.4:1 to 0.6:1 by weight of carbon in the feedstock.

15. The process of claim 1 which includes subjecting the cooled synthesis gas from step (h) to a water-gas shift reaction, recovering a mixed stream of hydrogen and carbon dioxide, and thereafter recovering a product stream of hydrogen.

16. The process of claim 15 in which the water-gas shift reaction is maintained at a temperature in the range of from 150° C. to 400° C. and a pressure of from 1 to 60 bars.

17. The process of claim 16 in which the water-to-carbon monoxide mole ratio is 5:1.

18. The process of claim 16 in which the water-to-carbon monoxide mole ratio is at least 3:1.

19. The process of claim 1 in which the heavy residual hydrocarbon oil feedstream is analyzed prior to its use in the process to determine its initial ash content.

20. A process for the gasification of coke from a delayed coking process, the gasification process comprising:
a. analyzing the coke from the delayed coking process to determine its ash content;
b. grinding the coke from the delayed coking process to produce a free-flowing mass of hydrocarbon-containing coke particles of predetermined ash content;
c. introducing the ground coke particles into a moving fluid feedstream to form a pressurized fluidized feed;
d. injecting the fluidized feedstream having a combined ash content of at least 2% by weight as derived from the coke into the combustion chamber of a cold-wall tubular wall membrane partial oxidation gasification reactor in the presence of a predetermined amount of oxygen;
e. operating the gasification reactor at a temperature in the range of 900° C. to 1700° C. and a pressure of from 20 to 100 bars;
f. subjecting the feedstock to partial oxidation to produce hydrogen, carbon monoxide and a slag material;
g. recovering the hydrogen and carbon monoxide from the reactor in the form of a synthesis gas;
h. passing the hot synthesis gas to a water-cooled heat exchanger to cool the synthesis gas; and
i. recovering high pressure steam from the heat exchanger and introducing the steam into a turbine to produce electricity.

21. The process of claim 20 in which the coke particles are fluidized in a gaseous feedstream to form the feed to the membrane reactor.

22. The process of claim 21 in which the gaseous feedstream contains oxygen.

23. The process of claim 21 in which the gaseous feedstream is air.

24. The process of claim 21 in which the gaseous feedstream is carbon dioxide.

* * * * *